United States Patent [19]

Narang

[11] Patent Number: 5,762,812

[45] Date of Patent: Jun. 9, 1998

[54] THERMAL INK JET PRINTHEAD AND PROCESS FOR PREPARATION THEREOF

[75] Inventor: Ram S. Narang, Fairport, N.Y.

[73] Assignee: Xerox Corporation, Stamford, Conn.

[21] Appl. No.: 641,719

[22] Filed: May 2, 1996

[51] Int. Cl.$^6$ .................................................. B32B 31/00
[52] U.S. Cl. ............................ 216/27; 156/234; 156/235
[58] Field of Search .............................. 216/27; 156/234, 156/235

[56] References Cited

U.S. PATENT DOCUMENTS

| | | | |
|---|---|---|---|
| 4,601,777 | 7/1986 | Hawkins et al. | 156/626 |
| 4,678,529 | 7/1987 | Drake et al. | 156/234 |
| 5,218,381 | 6/1993 | Narang et al. | 346/140 R |
| 5,336,319 | 8/1994 | Narang et al. | 118/211 |

*Primary Examiner*—Mark Chapman
*Attorney, Agent, or Firm*—Judith L. Byorick

[57] ABSTRACT

Disclosed is a thermal ink jet printhead which comprises (a) an upper substrate with a set of parallel grooves for subsequent use as ink channels and a recess for subsequent use as a manifold, the grooves being open at one end for serving as droplet emitting nozzles; and (b) a lower substrate in which one surface thereof has an array of heating elements and addressing electrodes formed thereon, the lower substrate having a thick film insulative layer deposited over the heating elements and addressing electrodes and patterned to form recesses therethrough to expose the heating elements and terminal ends of the addressing electrodes; said upper and lower substrates being aligned, mated, and bonded together to form the printhead with the grooves in the upper substrate being aligned with the heating elements in the lower substrate to form droplet emitting nozzles, wherein the upper and lower substrates are bonded together with an adhesive which comprises a reaction product of (a) an epoxy resin selected from the group consisting of (1) those of the formula

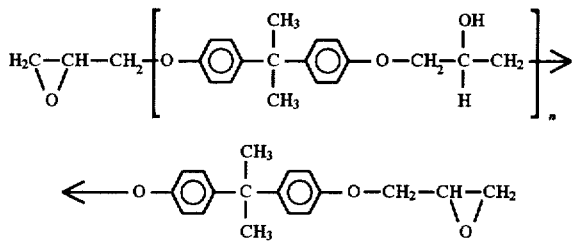

wherein n is an integer of from 1 to about 25; (2) those of the formula

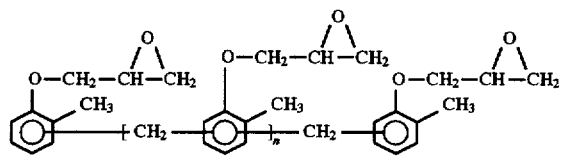

wherein n is an integer of from 1 to about 25; (3) those of the formula

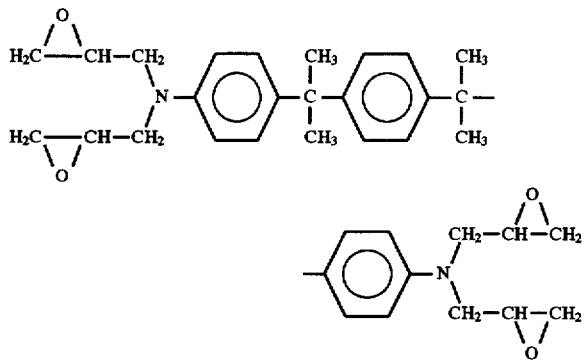

and (4) mixtures thereof; and (b) a curing agent which enables substantial curing of the epoxy resin at a temperature of not lower than the softening point of the resin and not higher than about 20° C. above the softening point of the resin within a period of no more than about 3 hours. Also disclosed are processes for preparing a thermal ink jet printhead with the aforementioned adhesive components.

31 Claims, 3 Drawing Sheets

THERMAL INK JET PRINTHEAD AND PROCESS FOR PREPARATION THEREOF

BACKGROUND OF THE INVENTION

The present invention is directed to thermal ink jet printheads and processes for preparing thermal ink jet printheads. More specifically, the present invention is directed to compositions and processes for preparing thermal ink jet printheads wherein the occurrence of the jet-explosion phenomenon is reduced or eliminated. One embodiment of the present invention is directed to a thermal ink jet printhead which comprises (a) an upper substrate with a set of parallel grooves for subsequent use as ink channels and a recess for subsequent use as a manifold, the grooves being open at one end for serving as droplet emitting nozzles; and (b) a lower substrate in which one surface thereof has an array of heating elements and addressing electrodes formed thereon, the lower substrate having a thick film insulative layer deposited over the heating elements and addressing electrodes and patterned to form recesses therethrough to expose the heating elements and terminal ends of the addressing electrodes; said upper and lower substrates being aligned, mated, and bonded together to form the printhead with the grooves in the upper substrate being aligned with the heating elements in the lower substrate to form droplet emitting nozzles, wherein the upper and lower substrates are bonded together with an adhesive which comprises a reaction product of (a) an epoxy resin selected from the group consisting of (1) those of the formula wherein n is an integer of from 1 to about 25; (2) those of the formula wherein n is an integer of from 1 to about 25; (3) those of the formula

-continued and (4) mixtures thereof; and (b) a curing agent which enables substantial curing of the epoxy resin at a temperature of not lower than the softening point of the resin and not higher than about 20° C. above the softening point of the resin within a period of no more than about 3 hours. Another embodiment of the present invention is directed to a process for preparing a thermal ink jet printhead which comprises the steps of: (a) providing an upper substrate with a set of parallel grooves for subsequent use as ink channels and a recess for subsequent use as a manifold, the grooves being open at one end for serving as droplet emitting nozles; (b) providing a lower substrate in which one surface thereof has an array of heating elements and addressing electrodes formed thereon, the lower substrate having a thick film insulative layer deposited over the heating elements and addressing electrodes and patterned to form recesses therethrough to expose the heating elements and terminal ends of the addressing electrodes; (c) applying an adhesive to the upper substrate, said adhesive comprising a mixture of (i) an epoxy resin selected from the group consisting of (1) those of the formula wherein n is an integer of from 1 to about 25; (2) those of the formula wherein n is an integer of from 1 to about 25; (3) those of the formula

-continued and (4) mixtures thereof; and (ii) a curing agent which enables substantial curing of the epoxy resin at a temperature of not lower than the softening point of the resin and not higher than about 20° C. above the softening point of the resin within a period of no more than about 3 hours; (d) aligning and mating the upper and lower substrates together to form a printhead with the grooves in the upper substrate being aligned with the heating elements in the lower substrate to form droplet emitting nozzles, with the adhesive being sandwiched between the upper and lower substrates; and (e) substantially curing the adhesive to bond the first and second substrates together by heating to a temperature of no less than the softening point of the resin and no more than about 20° C. above the softening point of the resin and applying a pressure to the first and second substrates of from about 10 to about 50 pounds per square inch. Still another embodiment of the present invention is directed to a process for preparing a thermal ink jet printhead which comprises the steps of: (a) providing an upper substrate with a set of parallel grooves for subsequent use as ink channels and a recess for subsequent use as a manifold, the grooves being open at one end for serving as droplet emitting nozzles; (b) providing a lower substrate in which one surface thereof has an array of heating elements and addressing electrodes formed thereon, the lower substrate having a thick film insulative layer deposited over the heating elements and addressing electrodes and patterned to form recesses therethrough to expose the heating elements and terminal ends of the addressing electrodes; (c) applying to the upper substrate an epoxy resin selected from the group consisting of (1) those of the formula wherein n is an integer of from 1 to about 25; (2) those of the formula wherein n is an integer of from 1 to about 25; (3) those of the formula and (4) mixtures thereof; (d) applying to the lower substrate a curing agent which enables substantial curing of the epoxy resin at a temperature of not lower than the softening point of the resin and not higher than about 20° C. above the softening point of the resin within a period of no more than about 3 hours; (e) aligning and mating the upper and lower substrates together to form a printhead with the grooves in the upper substrate being aligned with the heating elements in the lower substrate to form droplet emitting nozzles, with the epoxy and curing agent being sandwiched between the upper and lower substrates; and (f) heating the first and second substrates to a temperature of no less than the softening point of the resin and no more than about 20° C. above the softening point of the resin and applying a pressure to the first and second substrates of from about 10 to about 50 pounds per square inch until the resin is substantially cured.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are different types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to vaporize almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses. At this point, the resistor is no longer being heated because the current pulse has passed and, concurrently with the bubble collapse, the droplet is propelled at a high rate of speed in a direction towards a recording medium. The surface of the printhead encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet equipment and processes are well known and are described in, for example, U.S. Pat. No. 4,601,777, U.S. Pat. No. 4,251,824, U.S. Pat. No. 4,410,899, U.S. Pat. No. 4,412,224, U.S. Pat. No. 4,532,530, and U.S. Pat. No. 4,774,530, the disclosures of each of which are totally incorporated herein by reference.

The present invention is suitable for ink jet printing processes, including drop-on-demand systems such as thermal ink jet printing, piezoelectric drop-on-demand printing, and the like.

In ink jet printing, a printhead is usually provided having one or more ink-filled channels communicating with an ink supply chamber at one end and having an opening at the opposite end, referred to as a nozzle. These printheads form images on a recording medium such as paper by expelling droplets of ink from the nozzles onto the recording medium. The ink forms a meniscus at each nozzle prior to being expelled in the form of a droplet. After a droplet is expelled, additional ink surges to the nozzle to reform the meniscus.

In thermal ink jet printing, a thermal energy generator, usually a resistor, is located in the channels near the nozzles a predetermined distance therefrom. The resistors are individually addressed with a current pulse to momentarily vaporize the ink and form a bubble which expels an ink droplet. As the bubble grows, the ink bulges from the nozzle and is contained by the surface tension of the ink as a meniscus. The rapidly expanding vapor bubble pushes the column of ink filling the channel towards the nozzle. At the end of the current pulse the heater rapidly cools and the vapor bubble begins to collapse. However, because of inertia, most of the column of ink that received an impulse from the exploding bubble continues its forward motion and is ejected from the nozzle as an ink drop. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozle while the bubble is growing provides the momentum and velocity of the droplet in a substantially straight line direction towards a recording medium, such as paper.

Ink jet printheads include an array of nozzles and may, for example, be formed of silicon wafers using orientation dependent etching (ODE) techniques. The use of silicon wafers is advantageous because ODE techniques can form structures, such as nozzles, on silicon wafers in a highly precise manner. Moreover, these structures can be fabricated efficiently at low cost. The resulting nozzles are generally triangular in cross-section. Thermal ink jet printheads made by using the above-mentioned ODE techniques typically comprise a channel plate which contains a plurality of nozzle-defining channels located on a lower surface thereof bonded to a heater plate having a plurality of resistive heater elements formed on an upper surface thereof and arranged so that a heater element is located in each channel. The upper surface of the heater plate typically includes an insulative layer which is patterned to form recesses exposing the individual heating elements. This insulative layer is referred to as a "pit layer" and is sandwiched between the channel plate and heater plate. For examples of printheads employing this construction, see U.S. Pat. No. 4,774,530 and U.S. Pat. No. 4,829,324, the disclosures of each of which are totally incorporated herein by reference. Additional examples of thermal ink jet printheads are disclosed in, for example, U.S. Pat. No. 4,835,553, U.S. Pat. No. 5,057,853, and U.S. Pat. No. 4,678,529, the disclosures of each of which are totally incorporated herein by reference.

U.S. Pat. No. 4,601,777 (Hawkins et al.), the disclosure of which is totally incorporated herein by reference, discloses fabricating processes for ink jet printheads, each printhead being composed of two parts aligned and bonded together. One part is a substantially flat substrate which contains on the surface thereof a lineal array of heating elements and addressing electrodes, and the second part is a substrate having at least one recess anisotropically etched therein to serve as an ink supply manifold when the two parts are bonded together. A lineal array of parallel grooves are formed in the second part, so that one end of the grooves communicates with the manifold recess and the other ends are open for use as ink droplet expelling nozzles. Many printheads can be made simultaneously by producing a plurality of sets of heating elements array with their addressing electrodes on a silicon wafer and by placing alignment marks thereon at predetermined locations. A corresponding plurality of sets of channels and associated manifolds are produced in a second silicon wafer and, in one embodiment, alignment openings are etched thereon at predetermined locations. The two wafers are aligned via the alignment openings and alignment marks, then bonded together and diced into many separate printheads.

U.S. Pat. No. 4,678,529 (Drake et al.), the disclosure of which is totally incorporated herein by reference, discloses a method of bonding ink jet printhead components together by coating a flexible substrate with a relatively thin, uniform layer of an adhesive having an intermediate non-tacky curing stage with a shelf life with around one month for ease of alignment of the parts and ease of storage of the components having the adhesive thereon. Transferring about half of the adhesive layer on the flexible substrate to the high points or lands of one of the printhead components within a predetermined time of the coating of the flexible substrate is achieved by placing it in contact therewith and applying a predetermined temperature and pressure to the flexible substrate prior to peeling it from the printhead component. This process causes the adhesive to fail cohesively in the liquid state, assuring that about half of the thickness of the adhesive layer stays with the flexible substrate and is discarded therewith, leaving a very thin uniform layer of adhesive on the printhead component lands. The transferred adhesive layer remaining on the printhead component enters an intermediate non-tacky curing stage to assist in subsequent alignment of the printhead components. The printhead components are aligned and the adhesive layer cured to complete fabrication of the printhead.

U.S. Pat. No. 5,336,319 (Narang et al.), the disclosure of which is totally incorporated herein by reference, discloses an apparatus for uniformly coating a planar substrate with an adhesive layer. The apparatus has a rotatably mounted sleeve with closed ends to form an internal cavity therein. The sleeve has a plurality of holes therein and its outer surface is covered by a porous layer such as a foam layer. A vacuum is applied to the sleeve cavity while the sleeve is rotated. One surface of a polymeric film is positioned on the porous layer and held in place by the vacuum acting through the sleeve holes and porous layer. The other surface of the polymeric film contains a uniform adhesive coating. The surface of a planar substrate is tangentially transported past the polymeric film surface with the adhesive layer and in timed registration therewith, so that a nip is formed between the planar substrate and the polymeric film which transfers a uniformly thick portion of adhesive to the planar substrate surface.

Known processes for preparing thermal ink jet printheads often entail application of an adhesive between the heater and channel plate and heating at temperatures of around 150° C. to cure the adhesive. During this curing step, some of the adhesive can flow onto the channel walls and along the apices of the channels, resulting in formation of a thin film along the channel walls and a bead along the apex. This thin film of adhesive along the walls and apices frequently is not as resistant to attack by the ingredients commonly employed in thermal ink jet ink compositions as is the film of adhesive between the heater plate and the channel plate; in some instances, the film of adhesive along the walls and apices lasts only half as long as the film of adhesive between the channel plate and the heater plate. As a result of attack by the ink, the adhesive film along the channel walls delaminates from the walls and drops directly on top of the heater and bypass pits of the printhead, resulting in the "jet-explosion" phenomenon. With the onset of jet-explosion, the printing cartridge is no longer useful for normal printing purposes even though it remains useful in all other respects. Accordingly, it is desirable to avoid flow of the adhesive along the channel walls and apices during the curing process.

While known compositions and processes are suitable for their intended purposes, a need remains for improved thermal ink jet printheads. In addition, a need remains for improved processes for making thermal ink jet printheads. Further, there is a need for processes for preparing thermal ink jet printheads comprising an upper substrate bonded to a lower substrate with an adhesive, wherein coating of the channel walls by the adhesive is either completely eliminated or at least substantially reduced. Additionally, there is a need for processes for preparing thermal ink jet printheads with improved lifetimes. There is also a need for thermal ink jet printheads which exhibit reduced or eliminated jet-explosion. In addition, a need remains for thermal ink jet printheads with either completely eliminated or at least substantially reduced susceptibility to attack by ink compositions.

SUMMARY OF THE INVENTION

It is an object of the present invention to provide thermal ink jet printheads and processes for the preparation thereof with the above advantages.

It is another object of the present invention to provide improved thermal ink jet printheads.

It is yet another object of the present invention to provide improved processes for making thermal ink jet printheads.

It is still another object of the present invention to provide processes for preparing thermal ink jet printheads comprising an upper substrate bonded to a lower substrate with an adhesive, wherein coating of the channel walls by the adhesive is either completely eliminated or at least substantially reduced.

Another object of the present invention is to provide processes for preparing thermal ink jet printheads with improved lifetimes.

Yet another object of the present invention is to provide thermal ink jet printheads which exhibit reduced or eliminated jet-explosion.

Still another object of the present invention is to provide thermal ink jet printheads with either completely eliminated or at least substantially reduced susceptibility to attack by ink compositions.

These and other objects of the present invention (or specific embodiments thereof) can be achieved by providing a thermal ink jet printhead which comprises (a) an upper substrate with a set of parallel grooves for subsequent use as ink channels and a recess for subsequent use as a manifold, the grooves being open at one end for serving as droplet emitting nozles; and (b) a lower substrate in which one surface thereof has an array of heating elements and addressing electrodes formed thereon, the lower substrate having a thick film insulative layer deposited over the heating elements and addressing electrodes and patterned to form recesses therethrough to expose the heating elements and terminal ends of the addressing electrodes; said upper and lower substrates being aligned, mated, and bonded together to form the printhead with the grooves in the upper substrate being aligned with the heating elements in the lower substrate to form droplet emitting nozzles, wherein the upper and lower substrates are bonded together with an adhesive which comprises a reaction product of (a) an epoxy resin selected from the group consisting of (1) those of the formula wherein n is an integer of from 1 to about 25; (2) those of the formula wherein n is an integer of from 1 to about 25; (3) those of the formula and (4) mixtures thereof; and (b) a curing agent which enables substantial curing of the epoxy resin at a temperature of not lower than the softening point of the resin and not higher than about 20° C. above the softening point of the resin within a period of no more than about 3 hours. Another embodiment of the present invention is directed to a process for preparing a thermal ink jet printhead which comprises the steps of: (a) providing an upper substrate with a set of parallel grooves for subsequent use as ink channels and a recess for subsequent use as a manifold, the grooves being open at one end for serving as droplet emitting nozzles; (b) providing a lower substrate in which one surface thereof has an array of heating elements and addressing electrodes formed thereon, the lower substrate having a thick film insulative layer deposited over the heating elements and addressing electrodes and patterned to form recesses therethrough to expose the heating elements and terminal ends of the addressing electrodes; (c) applying an adhesive to the upper substrate, said adhesive comprising a mixture of (i) an epoxy resin selected from the group consisting of (1) those of the formula wherein n is an integer of from 1 to about 25; (2) those of the formula wherein n is an integer of from 1 to about 25; (3) those of the formula and (4) mixtures thereof; and (ii) a curing agent which enables substantial curing of the epoxy resin at a temperature of not lower than the softening point of the resin and not higher than about 20° C. above the softening point of the resin within a period of no more than about 3 hours; (d) aligning and mating the upper and lower substrates together to form a printhead with the grooves in the upper substrate being aligned with the heating elements in the lower substrate to form droplet emitting nozzles, with the adhesive being sandwiched between the upper and lower substrates; and (e) substantially curing the adhesive to bond the first and second substrates together by heating to a temperature of no less than the softening point of the resin and no more than about 20° C. above the softening point of the resin and applying a pressure to the first and second substrates of from about 10 to about 50 pounds per square inch. Still another embodiment of the present invention is directed to a process for preparing a thermal ink jet printhead which comprises the steps of: (a) providing an upper substrate with a set of parallel grooves for subsequent use as ink channels and a recess for subsequent use as a manifold, the grooves being open at one end for serving as droplet emitting nozzles; (b) providing a lower substrate in which one surface thereof has an array of heating elements and addressing electrodes formed thereon, the lower substrate having a thick film insulative layer deposited over the heating elements and addressing electrodes and patterned to form recesses therethrough to expose the heating elements and terminal ends of the addressing electrodes; (c) applying to the upper substrate an epoxy resin selected from the group consisting of (1) those of the formula wherein n is an integer of from 1 to about 25; (2) those of the formula wherein n is an integer of from 1 to about 25; (3) those of the formula and (4) mixtures thereof; (d) applying to the lower substrate a curing agent which enables substantial curing of the epoxy resin at a temperature of not lower than the softening point of the resin and not higher than about 20° C. above the softening point of the resin within a period of no more than about 3 hours; (e) aligning and mating the upper and lower substrates together to form a printhead with the grooves in the upper substrate being aligned with the heating elements in the lower substrate to form droplet emitting nozzles, with the epoxy and curing agent being sandwiched between the upper and lower substrates; and (f) heating the first and second substrates to a temperature of no less than the softening point of the resin and no more than about 20° C. above the softening point of the resin and applying a pressure to the first and second substrates of from about 10 to about 50 pounds per square inch until the resin is substantially cured.

DETAILED DESCRIPTION OF THE INVENTION

The printheads of the present invention can be of any suitable configuration. An example of a suitable configuration, suitable in this instance for thermal ink jet printing, is illustrated schematically in FIG. 1, which depicts an enlarged, schematic isometric view of the front face 29 of a printhead 10 showing the array of droplet emitting nozzles 27. Referring also to FIG. 2, discussed later, the lower electrically insulating substrate or heating element plate 28 has the heating elements 34 and addressing electrodes 33 patterned on surface 30 thereof, while the upper substrate or channel plate 31 has parallel grooves 20 which extend in one direction and penetrate through the upper substrate front face edge 29. The other end of grooves 20 terminate at slanted wall 21, the floor 41 of the internal recess 24 which is used as the ink supply manifold for the capillary filled ink channels 20, has an opening 25 therethrough for use as an ink fill hole. The surface of the channel plate with the grooves are aligned and bonded to the heater plate 28, so that a respective one of the plurality of heating elements 34 is positioned in each channel, formed by the grooves and the lower substrate or heater plate. Ink enters the manifold formed by the recess 24 and the lower substrate 28 through the fill hole 25 and by capillary action, fills the channels 20 by flowing through an elongated recess 38 formed in the thick film insulative layer 18. The ink at each nozzle forms a meniscus, the surface tension of which prevents the ink from weeping therefrom. The addressing electrodes 33 on the lower substrate or channel plate 28 terminate at terminals 32. The upper substrate or channel plate 31 is smaller than that of the lower substrate in order that the electrode terminals 32 are exposed and available for wire bonding to the electrodes on the daughter board 19, on which the printhead 10 is permanently mounted. Layer 18 is a thick film passivation layer, discussed later, sandwiched between the upper and lower substrates. This layer is etched to expose the heating elements, thus placing them in a pit, and is etched to form the elongated recess to enable ink flow between the manifold 24 and the ink channels 20. In addition, the thick film insulative layer is etched to expose the electrode terminals.

Figure 1:
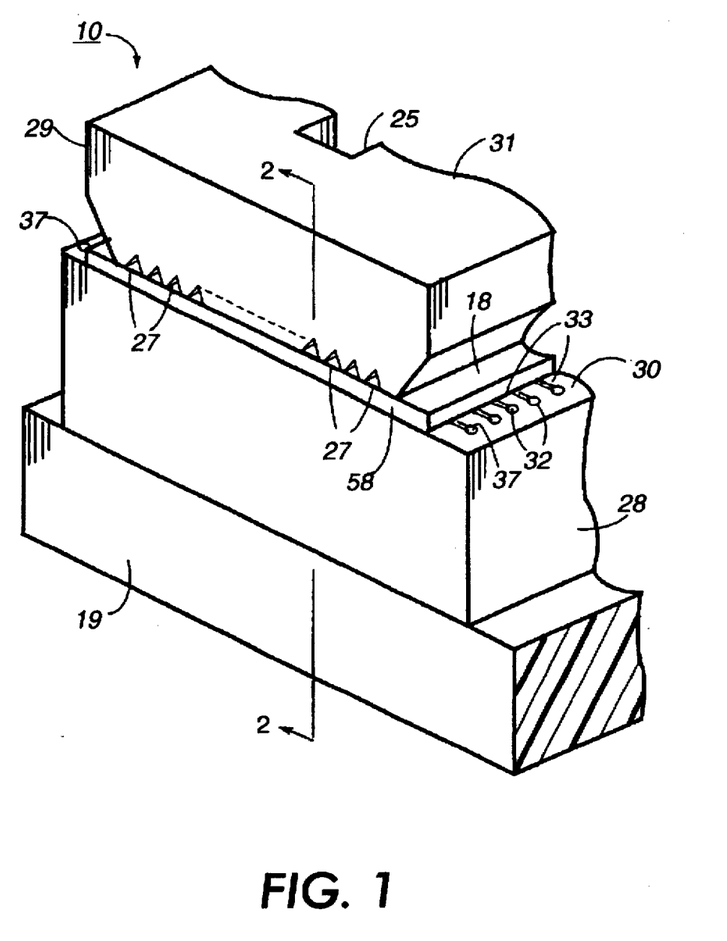
FIG. 1 is an enlarged schematic isometric view of an example of a printhead mounted on a daughter board showing the droplet emitting nozzles.
Figure 2:
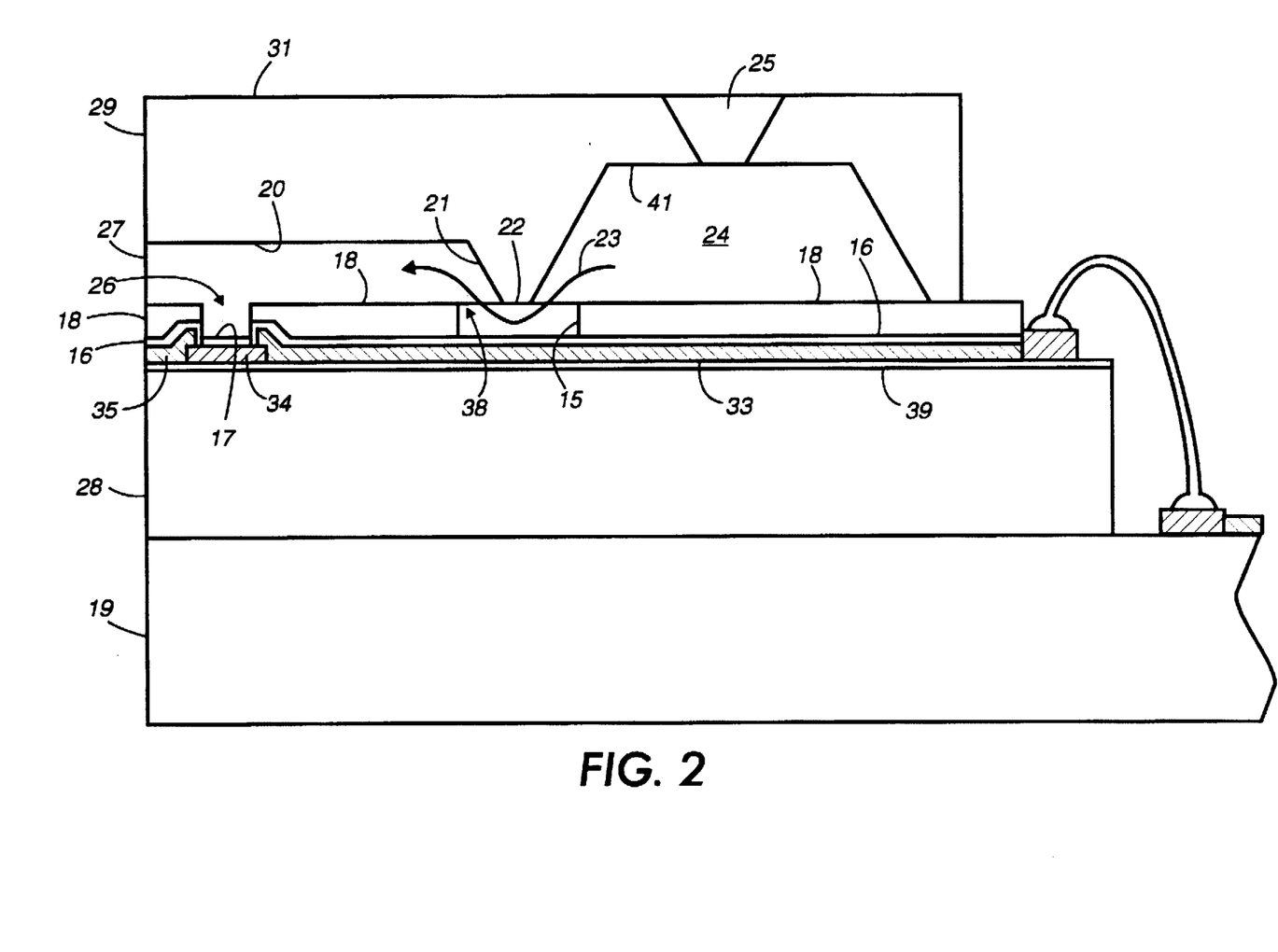
FIG. 2 is an enlarged cross-sectional view of FIG. 1 as viewed along the line 2—2 thereof and showing the electrode passivation and ink flow path between the manifold and the ink channels.

A cross sectional view of FIG. 1 is taken along view line 2—2 through one channel and shown as FIG. 2 to show how the ink flows from the manifold 24 and around the end 21 of the groove 20 as depicted by arrow 23. As is disclosed in U.S. Pat. No. 4,638,337, U.S. Pat. No. 4,601,777, and U.S. Pat. No. Re. 32,572, the disclosures of each of which are totally incorporated herein by reference, a plurality of sets of bubble generating heating elements 34 and their addressing electrodes 33 can be patterned on the polished surface of a single side polished (100) silicon wafer. Prior to patterning, the multiple sets of printhead electrodes 33, the resistive material that serves as the heating elements 34, and the common return 35, the polished surface of the wafer is coated with an underglaze layer 39 such as silicon dioxide, having a typical thickness of from about 5,000 Angstroms to about 2 microns, although the thickness can be outside this range. The resistive material can be a doped polycrystalline silicon, which can be deposited by chemical vapor deposition (CVD) or any other well known resistive material such as zirconium boride ($ZrB_2$). The common return and the addressing electrodes are typically aluminum leads deposited on the underglaze and over the edges of the heating elements. The common return ends or terminals 37 and addressing electrode terminals 32 are positioned at predetermined locations to allow clearance for wire bonding to the electrodes (not shown) of the daughter board 19, after the channel plate 31 is attached to make a printhead. The common return 35 and the addressing electrodes 33 are deposited to a thickness typically of from about 0.5 to about 3 microns, although the thickness can be outside this range, with the preferred thickness being 1.5 microns.

If polysilicon heating elements are used, they may be subsequently oxidized in steam or oxygen at a relatively high temperature, typically about 1,100° C. although the temperature can be above or below this value, for a period of time typically of from about 50 to about 80 minutes, although the time period can be outside this range, prior to the deposition of the aluminum leads, in order to convert a small portion of the polysilicon to $SiO_2$. In such cases, the heating elements are thermally oxidized to achieve an overglaze (not shown) of $SiO_2$ with a thickness typically of from about 500 Angstroms to about 1 micron, although the thickness can be outside this range, which has good integrity with substantially no pinholes.

In one embodiment, polysilicon heating elements are used and an optional silicon dioxide thermal oxide layer 17 is grown from the polysilicon in high temperature steam. The thermal oxide layer is typically grown to a thickness of from about 0.5 to about 1 micron, although the thickness can be outside this range, to protect and insulate the heating elements from the conductive ink. The thermal oxide is removed at the edges of the polysilicon heating elements for attachment of the addressing electrodes and common return, which are then patterned and deposited. If a resistive material such as zirconium boride is used for the heating elements, then other suitable well known insulative materials can be used for the protective layer thereover. Before electrode passivation, a tantalum (Ta) layer (not shown) can be optionally deposited, typically to a thickness of about 1 micron, although the thickness can be above or below this value, on the heating element protective layer 17 for added protection thereof against the cavitational forces generated by the collapsing ink vapor bubbles during printhead operation. The tantalum layer is etched off all but the protective layer 17 directly over the heating elements using, for example, $CF_4/O_2$ plasma etching. For polysilicon heating elements, the aluminum common return and addressing electrodes typically are deposited on the underglaze layer and over the opposing edges of the polysilicon heating elements which have been cleared of oxide for the attachment of the common return and electrodes.

For electrode passivation, a film 16 is deposited over the entire wafer surface, including the plurality of sets of heating elements and addressing electrodes. The passivation film 16 provides an ion barrier which will protect the exposed electrodes from the ink. Examples of suitable ion barrier materials for passivation film 16 include polyimide, plasma nitride, phosphorous doped silicon dioxide, materials disclosed hereinafter as being suitable for insulative layer 18, and the like, as well as any combinations thereof. An effective ion barrier layer is generally achieved when its thickness is from about 1000 Angstroms to about 10 microns, although the thickness can be outside this range. In 300 dpi printheads, passivation layer 16 preferably has a thickness of about 3 microns, although the thickness can be above or below this value. In 600 dpi printheads, the thickness of passivation layer 16 preferably is such that the combined thickness of layer 16 and layer 18 is about 25 microns, although the thickness can be above or below this value. The passivation film or layer 16 is etched off of the terminal ends of the common return and addressing electrodes for wire bonding later with the daughter board electrodes. This etching of the silicon dioxide film can be by either the wet or dry etching method. Alternatively, the electrode passivation can be by plasma deposited silicon nitrite ($Si_3N_4$).

Next, a thick film type insulative layer 18, of a material such as Riston®, Vacrel®, Probimer®, polyimide, or the like, is formed on the passivation layer 16, typically having a thickness of from about 10 to about 100 microns and preferably in the range of from about 25 to about 50 microns, although the thickness can be outside these ranges. Even more preferably, in 300 dpi printheads, layer 18 preferably has a thickness of about 30 microns, and in 600 dpi printheads, layer 18 preferably has a thickness of from about 20 to about 22 microns, although other thicknesses can be employed. The insulative layer 18 is photolithographically processed to enable etching and removal of those portions of the layer 18 over each heating element (forming recesses 26), the elongated recess 38 for providing ink passage from the manifold 24 to the ink channels 20, and over each electrode terminal 32, 37. The elongated recess 38 is formed by the removal of this portion of the thick film layer 18. Thus, the passivation layer 16 alone protects the electrodes 33 from exposure to the ink in this elongated recess 38.

Figure 3:
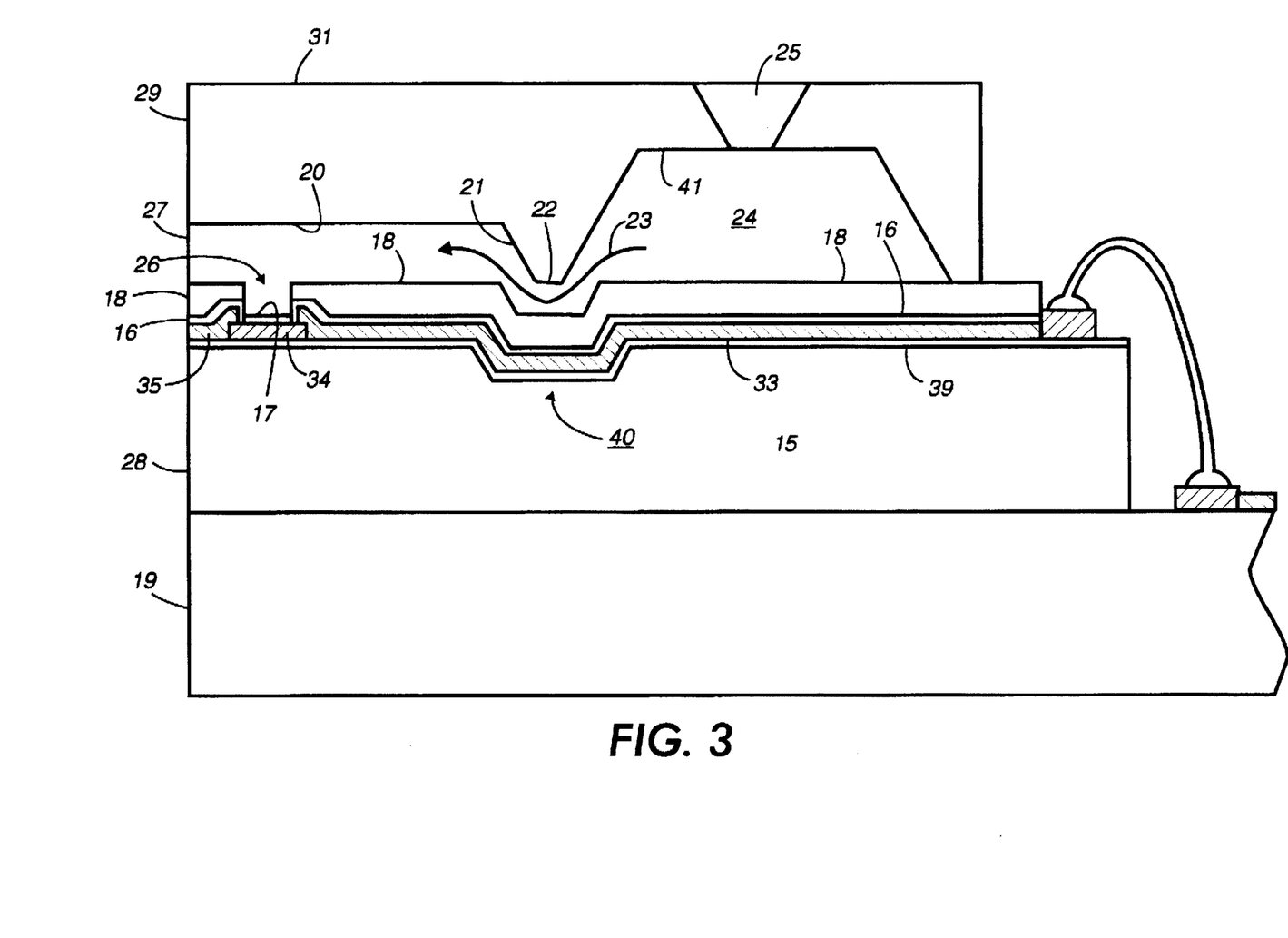
FIG. 3 is an enlarged cross-sectional view of an alternate embodiment of the printhead in FIG. 1 as viewed along the line 2—2 thereof.

FIG. 3 is a similar view to that of FIG. 2 with a shallow anisotropically etched groove 40 in the heater plate, which is silicon, prior to formation of the underglaze 39 and patterning of the heating elements 34, electrodes 33 and common return 35. This recess 40 permits the use of only the thick film insulative layer 18 and eliminates the need for the usual electrode passivating layer 16. Since the thick film layer 18 is impervious to water and relatively thick (typically from about 20 to about 40 microns, although the thickness can be outside this range), contamination introduced into the circuitry will be much less than with only the relatively thin passivation layer 16 well known in the art. The heater plate is a fairly hostile environment for integrated circuits. Commercial ink generally entails a low attention to purity. As a result, the active part of the heater plate will be at elevated temperature adjacent to a contaminated aqueous ink solution which undoubtedly abounds with mobile ions. In addition, it is generally desirable to run the heater plate at a voltage of from about 30 to about 50 volts, so that there will be a substantial field present. Thus, the thick film insulative layer 18 provides improved protection for the active devices and provides improved protection, resulting in longer operating lifetime for the heater plate.

When a plurality of lower substrates 28 are produced from a single silicon wafer, at a convenient point after the underglaze is deposited, at least two alignment markings (not shown) preferably are photolithographically produced at predetermined locations on the lower substrates 28 which make up the silicon wafer. These alignment markings are used for alignment of the plurality of upper substrates 31 containing the ink channels. The surface of the single sided wafer containing the plurality of sets of heating elements is bonded to the surface of the wafer containing the plurality of ink channel containing upper substrates subsequent to alignment.

As disclosed in U.S. Pat. No. 4,601,777 and U.S. Pat. No. 4,638,337, the disclosures of each of which are totally incorporated herein by reference, the channel plate is formed from a two side polished, (100) silicon wafer to produce a plurality of upper substrates 31 for the printhead. After the wafer is chemically cleaned, a pyrolytic CVD silicon nitrite layer (not shown) is deposited on both sides. Using conventional photolithography, a via for fill hole 25 for each of the plurality of channel plates 31 and at least two vias for alignment openings (not shown) at predetermined locations are printed on one wafer side. The silicon nitrite is plasma etched off of the patterned vias representing the fill holes and alignment openings. A potassium hydroxide (KOH) anisotropic etch can be used to etch the fill holes and alignment openings. In this case, the [111] planes of the (100) wafer typically make an angle of about 54.7 degrees with the surface of the wafer. The fill holes are small square surface patterns, generally of about 20 mils (500 microns) per side, although the dimensions can be above or below this value, and the alignment openings are from about 60 to about 80 mils (1.5 to 3 millimeters) square, although the dimensions can be outside this range. Thus, the alignment openings are etched entirely through the 20 mil (0.5 millimeter) thick wafer, while the fill holes are etched to a terminating apex at about halfway through to three-quarters through the wafer. The relatively small square fill hole is invariant to further size increase with continued etching so that the etching of the alignment openings and fill holes are not significantly time constrained.

Next, the opposite side of the wafer is photolithographically patterned, using the previously etched alignment holes as a reference to form the relatively large rectangular recesses 24 and sets of elongated, parallel channel recesses that will eventually become the ink manifolds and channels of the printheads. The surface 22 of the wafer containing the manifold and channel recesses are portions of the original wafer surface (covered by a silicon nitride layer) on which an adhesive, discussed in further detail hereinbelow, will be applied later for bonding it to the substrate containing the plurality of sets of heating elements. The adhesive is applied in a manner such that it does not run or spread into the grooves or other recesses. The alignment markings can be used with, for example, a vacuum chuck mask aligner to align the channel wafer on the heating element and addressing electrode wafer. The two wafers are accurately mated and can be tacked together by partial curing of the adhesive. Alternatively, the heating element and channel wafers can be given precisely diced edges and then manually or automatically aligned in a precision jig. Alignment can also be performed with an infrared aligner-bonder, with an infrared microscope using infrared opaque markings on each wafer to be aligned, or the like. The two wafers can then be cured in an oven or laminator to bond them together permanently. The channel wafer can then be milled to produce individual upper substrates. A final dicing cut, which produces end face 29, opens one end of the elongated groove 20 producing nozzles 27. The other ends of the channel groove 20 remain closed by end 21. However, the alignment and bonding of the channel plate to the heater plate places the ends 21 of channels 20 directly over elongated recess 38 in the thick film insulative layer 18 as shown in FIG. 2 or directly above the recess 40 as shown in FIG. 3 enabling the flow of ink into the channels from the manifold as depicted by arrows 23. The plurality of individual printheads produced by the final dicing are bonded to the daughter board and the printhead electrode terminals are wire bonded to the daughter board electrodes.

The printhead illustrated in FIGS. 1 through 3 constitutes a specific embodiment of the present invention. Any other suitable printhead configuration comprising ink-bearing channels terminating in nozzles on the printhead surface can also be employed with the materials disclosed herein to form a printhead of the present invention.

The adhesive used for bonding the channel and heater plates is a mixture of an epoxy resin and a curing agent. The epoxy resin can be of the general formula wherein n is an integer of from 1 to about 25, and preferably is an integer of from about 2 to about 10. The epoxy resin can also be of the general formula wherein n is an integer of from 1 to about 25, and preferably is an integer of from about 2 to about 10. The epoxy resin can further be of the formula

Mixtures of two or more different epoxy resins can also be employed. Epoxy resins of this type are often obtained as mixtures of molecules with different values of n. They are often characterized in terms of epoxide equivalent, which is the mass in grams of the resin which contains one mole of epoxy groups. For example, for a resin containing two epoxy groups per molecule, the epoxy equivalent is one half of the molecular weight. In addition, since the resins are not single crystalline chemical entities, it is not possible to measure sharp melting points; the melting points or softening points (for the purposes of this application, these two terms are used interchangeably) indicated herein were measured by differential scanning calorimetry (DSC). Epoxy resins of the above formula I are commercially available as, for example, EPON 1001 F (average n=2 or 3), with an epoxide equivalent of from about 525 to about 550 and a softening point of from about 75° to about 80° C., EPON 1004F (average n=4 to 6), with an epoxide equivalent of from about 800 to about 950 and a softening point of about 95° C., EPON 1007F (average n=10 to 15), with an epoxide equivalent of from about 1700 to about 2300 and a softening point of about 117° C., EPON 1009F (average n=15 to 26), with an epoxide equivalent of from about 2300 to about 3800 and a softening point of about 90° C., EPON 2002 (average n=2 to 4), with an epoxide equivalent of from about 675 to about 760 and a softening point of about 93° C., EPON 2004F (average n=4 to 6), with an epoxide equivalent of from about 875 to about 975 and a softening point of about 102° C., all available from Shell Oil Co., Houston, Tex., and the like. These epoxy resins can also be prepared by any known process, such as, for example, the reaction of phenol and acetone under acidic conditions to generate bisphenol A, followed by reaction of bisphenol A with epichlorohydrin in the presence of sodium hydroxide to form a chlorohydrin intermediate, followed by reaction of the intermediate with sodium hydroxide to generate the diglycidyl ether, as follows:

Epoxy resins of the above formula II are commercially available as, for example, EPON 164 (average n=3), with an epoxide equivalent of from about 200 to about 240 and a softening point of about 79° C., EPON DPS-155 (average n=1.6, with an epoxide equivalent of from about 174 to about 180 and a softening point of about 35° C., both available from Shell Oil Co., Houston, Tex., and the like. Epoxy resins of the above formula III are commercially available as, for example, EPON HPT 1071, available from Shell Oil Co., Houston, Tex., and the like. Further information regarding the synthesis and characterization of epoxy resins is disclosed in, for example, *Handbook of Epoxy Resins*, H. Lee and K. Neville, McGraw-Hill (1967), the disclosure of which is totally incorporated herein by reference.

Curing agents for epoxy resins are well known. Any desired or suitable curing agent may be employed, provided that it enables substantial curing of the epoxy at a temperature of no less than the softening point of the resin and no more than about 20° C. above the softening point of the resin within a period of no more than about 3 hours. Curing at temperatures equal to or greater than the softening point of the resin is desirable to facilitate wetting of the channel plate and heater plate surfaces, thereby ensuring formation of a good bond. It is further desired to effect curing at temperatures of no more than about 20° C. above the softening point of the resin, preferably no more than about 15° C. above the softening point of the resin, and more preferably no more than about 10° C. above the softening point of the resin. Curing at temperatures higher than about 20° C. above the softening point of the resin can result in some of the adhesive flowing onto the channel walls and along the apices of the channels, causing formation of a thin film along the channel walls and a bead along the apex. The curing agent reactivity varies with temperature; for example, if the curing agent initiates curing by generating $H^+$ ions, the mixture of epoxy resin and curing agent will always contain some $H^+$ ions even at room temperature, and curing at a slow rate thus will be occurring from the moment of admixture of the epoxy resin and curing agent. Raising the temperature of the mixture increases the relative amount of $H^+$ ions present, and thus raises the reaction rate and enables conversion of a higher percentage of the epoxy groups present. The mechanical properties of the cured resin are optimized when most or all of the epoxy groups have been opened within a period of time of no more than about 3 hours, preferably no more than about 2 hours, and more preferably no more than about 1 hour. Curing times of significantly less than one hour may be undesirable if conventional methods are used to heat the mixture of epoxy resin and curing agent, since the speed of the reaction may result in less than most or all of the epoxy groups being opened. It is believed, however, that when microwave radiation is employed as the heating source, significantly shorter curing times can be employed. Microwave heating enables uniform heating, and enables nearly 100 percent polymerization in very short periods of time, thereby further reducing adhesive flow onto the channel walls and along the apices of the channels. The $T_g$ of the resin generally increases as curing progresses. When the resin has become substantially cured, i.e., sufficiently crosslinked that higher temperatures do not cause the resin to flow on the channel walls, the temperature may be increased, if desired, to complete the process more quickly.

One particularly desirable class of curing agents are amidopolyamines, which can be obtained by the reaction of a monobasic carboxylic acid and an aliphatic polyamine, as follows:

wherein n is an integer of from about 10 to about 30, and preferably from about 15 to about 20. The acids employed in the synthesis are usually of the $C_{16}$, $C_{18}$, and $C_{19}$ types derived from fats and oils, particularly soya, tall oil, and ricinoleic acids. Special acids can also be employed, such as copolymers of castor oil fatty acid and styrene, copolymers of castor oil and vinyltoluene, rice oil (which contains free fatty acid and is otherwise a complex blend of glycerides), and the like. Examples of suitable polyamines include diethylenetriamine, triethylenetetraamine, tetraethylenepentaamine, piperazine, and the like. Examples of suitable polyamide curing agents include EPI-CURE® 3125 and 3140, available from Shell Oil Company, Houston, Tex. Any other desired or suitable curing agent may also be employed, such as primary, secondary, and tertiary aliphatic and aromatic amines, amides, acids, acid anhydrides, and the like. Numerous examples of suitable curing agents are disclosed in, for example, *Handbook of Epoxy esins*, H. Lee and K. Neville, McGraw-Hill (1967), the disclosure of which is totally incorporated herein by reference. Different curing agents may be preferred for different epoxy resins. For example, with EPON 1001F, 3125, 3140, and 1,2-cyclohexane dicarboxylic acid or 1,2-cyclohexane anhydride are preferred curing agents. With EPON 1004F, hexahydrophthalic anhydride (available from Aldrich Chemical Co., Milwaukee, Wis.) in the presence of an accelerator (such as a primary aliphatic polyamine, a tertiary amine, phenol, a phenol-containing tertiary amine, or the like) is a preferred curing agent. With EPON 1007F, 1,2-diaminocyclohexane (available from Aldrich Chemical Co.) is a preferred curing agent. With EPON 2002 and 2004, 2,4-ethylmethylimidazole (available from Aldrich Chemical Co.) is a preferred curing agent.

The adhesive and curing agent are applied to the channel plate and heater plate in any suitable or desired manner. For example, the adhesive and curing agent can be admixed and dissolved in a solvent, followed by application of the solution to the channel plate or heater plate either directly or via an intermediate. In this embodiment, the adhesive and curing agent are present in any suitable or desired relative amounts, typically from about 3 parts by weight adhesive and about 1 part by weight curing agent (3:1 ratio) to about 10 parts by weight adhesive and about 1 part by weight curing agent (10:1 ratio), although the relative amounts can be outside these ranges. The adhesive and curing agent are dissolved in a solvent in any desired or suitable relative amounts, typically from about 8 parts by weight solvent and about 2 parts by weight adhesive/curing agent (80/20 mixture) to about 9 parts by weight solvent and about 1 part by weight adhesive/curing agent (90/10 mixture), although the relative amounts can be outside these ranges. Examples of suitable solvents include, but are not limited to, methyl isobutyl ketone, xylene, other oxygenated solvents, and the like. In one specific embodiment, the adhesive and curing agent are admixed in a ratio of 10:1 and dissolved in a solvent mixture containing 25 percent by volume xylene and 75 percent by volume methyl isobutyl ketone. The solution contains about 20 percent by weight of the adhesive/curing agent and about 80 percent by weight of the solvent. A film of this solution about 4 microns or less in thickness (and preferably about 1 or 2 microns thick) is applied to a flexible donor element, such as a polyester disk, by, for example, a spray coating or a spin coating process. Transfer of the film from the donor element to the channel plate takes place at a temperature which varies according to the $T_g$ of the particular mixture of resin and curing agent selected; preferably the transfer temperature is ±5° C. of the $T_g$. In this particular instance, the donor element bearing the film is then placed into contact with the channel plate at a temperature of from about 65° to about 75° C. and under slight pressure, thereby transferring the film from the donor element to the bonding areas of the channel plate, followed by peeling away the donor element from the channel plate. Thereafter, the heater plate and the channel plate are aligned, tacked together, and annealed at a temperature of about 75° C. for a period of about 1 hour under a hydrostatic pressure of from about 10 to about 50 pounds per square inch, preferably from about 20 to about 40 pounds per square inch, and more preferably from about 25 to about 35 pounds per square inch, to straighten the plates so that no gaps occur in the bonded plates.

The shelf life of the mixture of adhesive and curing agent may in some instances be about one day. If it is desired to avoid the need to admix a fresh mixture of adhesive and curing agent every day, the bonding process can be modified. For example, the epoxy adhesive can be applied to the channel plate by the procedure described above, but with the curing agent absent from the solution. Thereafter, the heater plate is sprayed with a dilute solution of the curing agent immediately prior to the bonding of the channel plate to the heater plate.

If desired, an adhesion promoter can be included in the adhesive layer. The adhesion promoter can be applied by any suitable or desired manner, such as by spraying a coating of the adhesion promoter onto the channel plate followed by heating, by including the adhesion promoter as an additional component of the epoxy resin/curing agent mixture, or the like. If the adhesion promoter is present as a component of the epoxy resin/curing agent mixture, it is typically present in an amount of about 0.1 percent by weight, although the amount can be greater or lesser than this value. The adhesion promoter improves adhesion of the cured epoxy resin to the silicon portions of the printhead. Examples of suitable adhesion promoters include dialkoxy silanes and trialkoxy silanes, such as N-(β-aminoethyl)-γ-aminopropyltrimethoxysilane (Z-6020, available from Dow Corning, Midland, Mich.), of the formula $(CH_3O)_3SiCH_2CH_2CH_2NHCH_2CH_2NH_2$, and the like. This particular adhesion promoter has amine groups which bond well to the cured epoxy resin and methoxy groups which bond well with the hydroxyl groups on the surface of a silicon channel wafer.

Further details regarding methods of fabricating printheads are disclosed in, for example, U.S. Pat. No. 4,678,529, U.S. Pat. No. 5,057,853, U.S. Pat. No. 4,774,530, U.S. Pat. No. 4,835,553, U.S. Pat. No. 4,638,337, U.S. Pat. No. 5,336,319, and U.S. Pat. No. 4,601,777, the disclosures of each of which are totally incorporated herein by reference.

The present invention also encompasses printing processes with printheads according to the present invention. One embodiment of the present invention is directed to an ink jet printing process which comprises (1) preparing an ink jet printhead comprising a plurality of channels, wherein the channels are capable of being filled with ink from an ink supply and wherein the channels terminate in nozzles on one surface of the printhead, said preparation being according to the process of the present invention; (2) filling the channels with an ink; and (3) causing droplets of ink to be expelled from the nozzles onto a receiver sheet in an image pattern. A specific embodiment of this process is directed to a thermal ink jet printing process, wherein the droplets of ink are caused to be expelled from the nozzles by heating selected channels in an image pattern. The droplets can be expelled onto any suitable receiver sheet, such as fabric, plain paper such as Xerox® 4024 or 4010, coated papers, transparency materials, or the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Adhesive mixtures were prepared by admixing 20 parts by weight EPON 1001F epoxy resin in 80 parts by weight of a solvent containing 25 percent by volume xylene and 75 percent by volume methyl isobutyl ketone, admixing 2 parts by weight of the amine curing agent "Y" (obtained from Shell Chemical Co., Houston, Tex.) in the same xylene/MIBK solvent, and admixing portions of the epoxy resin solution with each of the curing agents so that the resulting solution contained 10 parts by weight epoxy resin for every 1 part by weight curing agent. Substrates comprising 7 mil thick polyethylene terephthalate (MYLAR) were each coated with the adhesive mixtures by a spin coating process at 3,000 rpm for 30 seconds. Channel plates of silicon were oxygen plasma cleaned, followed by transfer of the adhesive mixtures to the "land" portions of the channel plates by placing the adhesive-coated substrates in contact with the land portions of the channel plates at a temperature of 65° C. at 4 to 10 inches per minute under slight pressure, followed by peeling away the polyethylene terephthalate substrate. Thereafter, the channel wafers were each heated at temperatures ranging from about 30° C. to about 110° C. while being held in a horizontal position. At temperatures higher than about 20° C. above the $T_g$ for the epoxy, and in this particular instance at temperatures above about 80° C., the adhesive mixture started to flow onto the channel walls and into the apex of the channel.

A channel plate was coated by the method described above and was then aligned and mated with a heater plate. The printhead thus formed was heated at a temperature of 150° C. under a hydrostatic pressure of about 30 pounds per square inch to effect curing. At this temperature, curing was accomplished in a period of about two hours. During the bonding process, some of the adhesive mixture flowed onto the channel walls and into the channel apex, resulting in formation of a thin film along the channel walls and formation of a thick bead along the apex.

A channel plate was coated by the method described above and was then aligned and mated with a heater plate. The printhead thus formed was heated at a temperature of 80° C. under a hydrostatic pressure of about 30 pounds per square inch to effect curing. At this temperature, curing was accomplished in a period of about 5 days.

Thereafter, a channel plate was coated by the same method with an adhesive mixture as described above except that the amine curing agent "Y" was replaced with the polyamide curing agent 3140 (obtained from Shell Chemical Co., Houston, Tex.). The printhead thus formed was heated at a temperature of 75° C. under a hydrostatic pressure of about 30 pounds per square inch to effect curing. At this temperature, curing was accomplished in a period of about 1 hour.

EXAMPLE II

Several silicon channel plates were coated by the method described in Example I with a coating containing 19.8 parts by weight EPON 1001F resin, 2.1 parts by weight 3140 curing agent, and 0.07 parts by weight Z 6020 adhesion promoter (obtained from Dow Corning Co., Midland, Mich.). The donor elements in this instance were 2 mil thick polyethylene terephthalate disks coated at 1,700 rpm. Transfer took place at a temperature of 65° C. In some instances, a delay (as indicated in the table below) was imposed between admixing of the coating ingredients and coating of the donor elements. At specific times indicated in the table below (measured between completion of coating of the channel plates and mating and bonding of the heater and channel plates) the channel plates were aligned and mated with heater plates. The printheads thus formed were maintained under a hydrostatic pressure of about 30 pounds per square inch. The curing profile was as follows: 95° C. for 45 minutes; 110° C. for 15 minutes; 125° C. for 15 minutes; 135° C. for 15 minutes; and 150° C. for 60 minutes. Average shear strengths for the bond between heater and channel plate are shown below:

| Sample | time from mixing to coating | time from coating to bonding | Average Shear |
|---|---|---|---|
| 1 | 0 | 1 hour | 25.0 lbs. |
| 2 | 0 | 3 hours | 19.5 lbs. |
| 3 | 0 | 4 hours | 27.1 lbs. |
| 4 | 3 hours | 1 hour | 28.6 lbs. |

The process was repeated except that the curing profile was as follows: 95° C. for 45 minutes; 115° C. for 13 minutes; 125° C. for 15 minutes; 135° C. for 15 minutes; and 150° C. for 60 minutes. Average shear strengths for the bond between heater and channel plate are shown below:

| Sample | time from mixing to coating | time from coating to bonding | Average Shear |
|---|---|---|---|
| 5 | 0 | 1 hour | 26.9 lbs. |
| 6 | 0 | 3 hours | 26.7 lbs. |
| 7 | 0 | 4 hours | 31.1 lbs. |
| 8 | 3 hours | 1 hour | 27.4 lbs. |

While optimal results are obtained with the stepped profiles shown above, for manufacturing purposes, a two-step cure entailing curing at about 90° C. for about 45 minutes followed by curing at about 150° C. or higher for about 30 minutes also yields acceptable results.

Other embodiments and modifications of the present invention may occur to those skilled in the art subsequent to a review of the information presented herein; these embodiments and modifications, as well as equivalents thereof, are also included within the scope of this invention.

What is claimed is:

1. A thermal ink jet printhead which comprises (a) an upper substrate with a set of parallel grooves for subsequent use as ink channels and a recess for subsequent use as a manifold, the grooves being open at one end for serving as droplet emitting nozzles; and (b) a lower substrate in which one surface thereof has an array of heating elements and addressing electrodes formed thereon, the lower substrate having a thick film insulative layer deposited over the heating elements and addressing electrodes and patterned to form recesses therethrough to expose the heating elements and terminal ends of the addressing electrodes; said upper and lower substrates being aligned, mated, and bonded together to form the printhead with the grooves in the upper substrate being aligned with the heating elements in the lower substrate to form droplet emitting nozzles, wherein the upper and lower substrates are bonded together with an adhesive which comprises a reaction product of (i) an epoxy resin selected from the group consisting of (1) those of the formula wherein n is an integer of from 1 to about 25; (2) those of the formula wherein n is an integer of from 1 to about 25; (3) those of the formula and (4) mixtures thereof; and (ii) a curing agent which enables substantial curing of the epoxy resin at a temperature of not lower than the softening point of the resin and not higher than about 20° C. above the softening point of the resin within a period of no more than about 3 hours.

2. A printhead according to claim 1 wherein the epoxy resin is of the formula wherein n is an integer of from 1 to about 25.

3. A printhead according to claim 2 wherein n is an integer of from about 2 to about 10.

4. A printhead according to claim 1 wherein the epoxy resin is of the formula wherein n is an integer of from 1 to about 25.

5. A printhead according to claim 4 wherein n is an integer of from about 2 to about 10.

6. A printhead according to claim 1 wherein the epoxy resin is of the formula

7. A printhead according to claim 1 wherein the curing agent is of the formula wherein n is an integer of from about 10 to about 30.

8. A printhead according to claim 7 wherein n is an integer of from about 15 to about 20.

9. A printhead according to claim 1 wherein the curing agent is selected from the group consisting of 1,2-cyclohexane dicarboxylic acid, 1,2-cyclohexane anhydride, hexahydrophthalic anhydride, 1,2-diaminocyclohexane, and 2,4-ethylmethylimidazole.

10. A process for preparing a thermal ink jet printhead which comprises the steps of: (a) providing an upper substrate with a set of parallel grooves on at least one surface thereof for subsequent use as ink channels and a recess for subsequent use as a manifold, the grooves being open at one end for serving as droplet emitting nozzles; (b) providing a lower substrate in which one surface thereof has an array of heating elements and addressing electrodes formed thereon, the lower substrate having a thick film insulative layer deposited over the heating elements and addressing electrodes and patterned to form recesses therethrough to expose the heating elements and terminal ends of the addressing electrodes; (c) applying an adhesive to the upper substrate, said adhesive comprising a mixture of (i) an epoxy resin selected from the group consisting of (1) those of the formula wherein n is an integer of from 1 to about 25; (2) those of the formula wherein n is an integer of from 1 to about 25; (3) those of the formula and (4) mixtures thereof; and (ii) a curing agent which enables substantial curing of the epoxy resin at a temperature of not lower than the softening point of the resin and not higher than about 20° C. above the softening point of the resin within a period of no more than about 3 hours; (d) aligning and mating the upper and lower substrates together to form a printhead with the grooves in the upper substrate being aligned with the heating elements in the lower substrate to form droplet emitting nozzles, with the adhesive being sandwiched between the upper and lower substrates; and (e) substantially curing the adhesive to bond the first and second substrates together by heating to a temperature of no less than the softening point of the resin and no more than about 20° C. above the softening point of the resin and applying a pressure to the first and second substrates of from about 10 to about 50 pounds per square inch.

11. A process according to claim 10 wherein the epoxy resin is of the formula

-continued wherein n is an integer of from 1 to about 25.

12. A process according to claim 11 wherein n is an integer of from about 2 to about 10.

13. A process according to claim 10 wherein the epoxy resin is of the formula wherein n is an integer of from 1 to about 25.

14. A process according to claim 13 wherein n is an integer of from about 2 to about 10.

15. A process according to claim 10 wherein the epoxy resin is of the formula

16. A process according to claim 10 wherein the curing agent is of the formula $$CH_3(CH_2)_n-\overset{O}{\overset{\|}{C}}-NHCH_2CH_2NHCH_2CH_2NH_2$$

wherein n is an integer of from about 10 to about 30.

17. A process according to claim 16 wherein n is an integer of from about 15 to about 20.

18. A process according to claim 10 wherein the curing agent is selected from the group consisting of 1,2-cyclohexane dicarboxylic acid, 1,2-cyclohexane anhydride, hexahydrophthalic anhydride, 1,2-diaminocyclohexane, and 2,4-ethylmethylimidazole.

19. A process according to claim 10 wherein substantial curing occurs within a period of no more than about 2 hours.

20. A process according to claim 10 wherein the adhesive is applied to the upper substrate by a process which comprises the steps of applying a layer of the adhesive to a flexible substrate; placing the adhesive layer on the flexible substrate on the surface of the upper substrate having the grooves and heating the adhesive layer, thereby lowering the viscosity of the adhesive, wherein the adhesive layer contacts only the surface portions of the upper substrate and does not contact any of the grooves; and peeling the flexible substrate away from the surface of the upper substrate while the adhesive is in a state of lowered viscosity, thereby causing the adhesive layer to fail cohesively and resulting in at least some of the adhesive layer remaining on the flexible substrate and the remainder of the adhesive layer coating the surface portions of the upper substrate.

21. A process for preparing a thermal ink jet printhead which comprises the steps of: (a) providing an upper substrate with a set of parallel grooves on at least one surface thereof for subsequent use as ink channels and a recess for subsequent use as a manifold, the grooves being open at one end for serving as droplet emitting nozzles; (b) providing a lower substrate in which one surface thereof has an array of heating elements and addressing electrodes formed thereon, the lower substrate having a thick film insulative layer deposited over the heating elements and addressing electrodes and patterned to form recesses therethrough to expose the heating elements and terminal ends of the addressing electrodes; (c) applying to the upper substrate an epoxy resin selected from the group consisting of (1) those of the formula wherein n is an integer of from 1 to about 25; (2) those of the formula wherein n is an integer of from 1 to about 25; (3) those of the formula and (4) mixtures thereof; (d) applying to the lower substrate a curing agent which enables substantial curing of the epoxy resin at a temperature of not lower than the softening point of the resin and not higher than about 20° C. above the softening point of the resin within a period of no more than about 3 hours; (e) aligning and mating the upper and lower substrates together to form a printhead with the grooves in the upper substrate being aligned with the heating elements in the lower substrate to form droplet emitting nozzles, with the epoxy and curing agent being sandwiched between the upper and lower substrates; and (f) heating the first and second substrates to a temperature of no less than the softening point of the resin and no more than about 20° C. above the softening point of the resin and applying a pressure to the first and second substrates of from about 10 to about 50 pounds per square inch until the resin is substantially cured.

22. A process according to claim 21 wherein the epoxy resin is of the formula wherein n is an integer of from 1 to about 25.

23. A process according to claim 22 wherein n is an integer of from about 2 to about 10.

24. A process according to claim 21 wherein the epoxy resin is of the formula wherein n is an integer of from 1 to about 25.

25. A process according to claim 24 wherein n is an integer of from about 2 to about 10.

26. A process according to claim 21 wherein the epoxy resin is of the formula

27. A process according to claim 21 wherein the curing agent is of the formula wherein n is an integer of from about 10 to about 30.

28. A process according to claim 27 wherein n is an integer of from about 15 to about 20.

29. A process according to claim 21 wherein the curing agent is selected from the group consisting of 1,2-cyclohexane dicarboxylic acid, 1,2-cyclohexane anhydride, hexahydrophthalic anhydride, 1,2-diaminocyclohexane, and 2,4-ethylmethylimidazole.

30. A process according to claim 21 wherein substantial curing occurs within a period of no more than about 2 hours.

31. A process according to claim 21 wherein the epoxy is applied to the upper substrate by a process which comprises the steps of applying a layer of the epoxy to a flexible substrate; placing the epoxy layer on the flexible substrate on the surface of the upper substrate having the grooves and heating the epoxy layer, thereby lowering the viscosity of the epoxy, wherein the epoxy layer contacts only the surface portions of the upper substrate and does not contact any of the grooves; and peeling the flexible substrate away from the surface of the upper substrate while the epoxy is in a state of lowered viscosity, thereby causing the epoxy layer to fail cohesively and resulting in at least some of the epoxy layer remaining on the flexible substrate and the remainder of the epoxy layer coating the surface portions of the upper substrate.

* * * * *